(12) United States Patent
Nygaard et al.

(10) Patent No.: US 7,633,635 B2
(45) Date of Patent: Dec. 15, 2009

(54) METHOD AND SYSTEM FOR AUTOMATICALLY IDENTIFYING NON-LABELED, MANUFACTURED PARTS

(75) Inventors: Gregory M. Nygaard, Clarkston, MI (US); John V. McKowen, Grand Blanc, MI (US)

(73) Assignee: GII Acquisitions, LLC, Davisburg, MI (US)

( * ) Notice: Subject to any disclaimer, the term of this patent is extended or adjusted under 35 U.S.C. 154(b) by 201 days.

(21) Appl. No.: 11/500,084

(22) Filed: Aug. 7, 2006

(65) Prior Publication Data

US 2008/0029596 A1 Feb. 7, 2008

(51) Int. Cl.
*G01B 11/04* (2006.01)

(52) U.S. Cl. .................. 356/638; 356/613; 356/72; 324/228; 186/2

(58) Field of Classification Search .................. 356/638
See application file for complete search history.

(56) References Cited

U.S. PATENT DOCUMENTS

| | | | |
|---|---|---|---|
| 3,146,395 A | 8/1964 | Quittner | |
| 3,500,181 A | 3/1970 | Jackson | |
| 3,518,533 A | 6/1970 | Arnelo | |
| 3,731,184 A | 5/1973 | Goldberg et al. | |
| 3,870,890 A | 3/1975 | Binks et al. | |
| 3,936,733 A | 2/1976 | Clary | |
| 3,940,690 A | 2/1976 | Suhr et al. | |
| 4,129,384 A | 12/1978 | Walker et al. | |
| 4,272,189 A | 6/1981 | Bailey et al. | |
| 4,315,688 A | 2/1982 | Pryor | |
| 4,351,184 A | 9/1982 | Garner et al. | |
| 4,358,202 A | 11/1982 | Puffer et al. | |
| 4,432,648 A | 2/1984 | Musto et al. | |
| 4,480,225 A | 10/1984 | Nance et al. | |
| 4,507,610 A | 3/1985 | Nakaoka | |
| 4,541,722 A | 9/1985 | Jenks | |
| 4,630,229 A | 12/1986 | D'Hondt | |
| 4,659,990 A | 4/1987 | Tore | |
| 4,667,093 A * | 5/1987 | MacDonald | 250/223 R |
| 4,719,422 A | 1/1988 | deWalle et al. | |

(Continued)

FOREIGN PATENT DOCUMENTS

DE 260 983 A1 10/1988

(Continued)

*Primary Examiner*—Gregory J Toatley, Jr.
*Assistant Examiner*—Rebecca C Slomski
(74) *Attorney, Agent, or Firm*—Brooks Kushman P.C.

(57) ABSTRACT

A method and system are provided for automatically identifying non-labeled, manufactured parts. The system includes an electronic storage device to store templates of a plurality of known good, manufactured parts. Each of the templates includes a part profile and a set of features. Each of the features includes a range of acceptable values. Each of the templates has a part identification code associated therewith. A first subsystem optically measures a profile and features of a part to be purchased. The system further includes a processor operable to compare the profile and the features of the part to be purchased with the profile and corresponding features of each of the stored templates to identify a template which most closely matches the profile and features of the part to be purchased and to generate and transmit an identification signal representing the part identification code for the part associated with the most closely matched template.

18 Claims, 5 Drawing Sheets

U.S. PATENT DOCUMENTS

| | | |
|---|---|---|
| 4,747,689 A | 5/1988 | Aldred |
| 4,748,332 A | 5/1988 | Kuhne et al. |
| 4,753,532 A | 6/1988 | Aldred |
| 4,778,271 A | 10/1988 | Kuwabara et al. |
| 4,792,018 A * | 12/1988 | Humble et al. ............ 186/61 |
| 4,801,207 A | 1/1989 | Williams |
| 4,806,776 A | 2/1989 | Kley |
| 4,829,247 A | 5/1989 | Wallrafen |
| 4,831,251 A | 5/1989 | Hanna |
| 4,893,077 A | 1/1990 | Auchterlonie |
| 4,906,927 A | 3/1990 | Urata et al. |
| 4,971,445 A | 11/1990 | Sato et al. |
| 5,004,929 A | 4/1991 | Kakinoki et al. |
| 5,041,786 A | 8/1991 | Takaishi et al. |
| 5,291,272 A | 3/1994 | Demirsu |
| 5,383,021 A | 1/1995 | Hanna |
| 5,383,022 A | 1/1995 | Kaser et al. |
| 5,412,319 A | 5/1995 | Ciani |
| 5,466,945 A | 11/1995 | Brickell et al. |
| 5,559,431 A | 9/1996 | Sellen |
| 5,568,263 A | 10/1996 | Hanna |
| 5,608,530 A | 3/1997 | Gates |
| 5,636,028 A | 6/1997 | Stringer et al. |
| 5,638,000 A | 6/1997 | Forster |
| 5,831,737 A | 11/1998 | Stringer et al. |
| 5,841,542 A | 11/1998 | Milana et al. |
| 5,867,265 A | 2/1999 | Thomas |
| 5,895,439 A | 4/1999 | Fisher et al. |
| 6,005,392 A | 12/1999 | Patzwaldt |
| 6,049,386 A | 4/2000 | Stringer et al. |
| 6,055,329 A | 4/2000 | Mufti |
| 6,075,594 A | 6/2000 | Thomas et al. |
| 6,139,800 A | 10/2000 | Chandler |
| 6,223,877 B1 * | 5/2001 | McGinty et al. ............ 194/317 |
| 6,252,661 B1 | 6/2001 | Hanna |
| 6,285,034 B1 | 9/2001 | Hanna et al. |
| 6,288,536 B1 | 9/2001 | Mandl et al. |
| 6,313,948 B1 | 11/2001 | Hanna |
| 6,424,745 B1 | 7/2002 | Hansen et al. |
| 6,457,644 B1 | 10/2002 | Collins, Jr. et al. |
| 6,549,293 B2 | 4/2003 | Hofman |
| 6,598,791 B2 | 7/2003 | Bellis, Jr. et al. |
| 6,929,110 B2 * | 8/2005 | Dobbins et al. ............ 194/334 |
| 6,959,108 B1 | 10/2005 | Bartelt et al. |
| 7,044,370 B2 | 5/2006 | Bellis, Jr. et al. |
| 2004/0075429 A1 | 4/2004 | Hiroshima |
| 2005/0174567 A1 | 8/2005 | Hanna |
| 2006/0022669 A1 | 2/2006 | Nygaard |
| 2006/0236792 A1 | 10/2006 | Hanna |

FOREIGN PATENT DOCUMENTS

| | | |
|---|---|---|
| EP | 0 256 539 A2 | 2/1988 |
| JP | 57-161608 | 10/1982 |
| JP | 60-142204 | 7/1985 |
| WO | WO 2005/022076 A2 | 3/2005 |

* cited by examiner

METHOD AND SYSTEM FOR AUTOMATICALLY IDENTIFYING NON-LABELED, MANUFACTURED PARTS

BACKGROUND OF THE INVENTION

1. Field of the Invention

The present invention relates to methods and systems for automatically identifying non-labeled, manufactured parts.

2. Background Art

Bar code readers are used extensively in many retail industries, such as hardware stores, at checkout stations to identify tagged items affixed with bar code tags. An item is identified by means of its bar code using a database stored in a host computer. Typically, a description of the item and its price are printed on a hardware store receipt and an ongoing price total is kept as additional items are scanned.

The use of bar code readers has generally been well received by the public, due in part, to the reliability and reduced time spent in the checkout line. However, a reliable system is needed to identify items for which it is undesirable or impractical to attach bar code labels, for example, manufactured bulk parts, such as individual fasteners such as nuts and bolts. Such parts or items are typically not identified and recorded by a bar code reader since such items are typically not labeled with bar codes. Identification of manufactured bulk items is still a task for the checkout operator, who must identify the item and then manually enter an item identification code. Operator identification methods are slow and inefficient because they typically involve a visual comparison of the item with pictures of the items. This time-consuming process can cause bottlenecks at the checkout stations, reducing throughput and making customers unhappy.

U.S. Pat. No. 6,424,745 discloses a method and system for optically recognizing an object from a reference library of known products based on a spectrum of local radius of curvature of the object. A surface portion of an object is illuminated with a pattern of light that permits the extraction of three dimensional coordinates for a set of points on the surface portion of the object. An image data set of the surface portion of the object is then captured with a capture device that is positioned at an angular offset with respect to a source of the light. That is, the combination of the light pattern and the imaging device together generate a two dimensional captured image, from which it is possible to extract the three dimensional coordinates for the set of points on the surface portion of the object. A set of local radii of curvatures are then determined for selected data points in the image data set. A spectrum representing a distribution of the curvatures is then computed for the set of local radii of curvatures. If the data set is for the generation of a library of spectra, it is processed with a dimension reduction analysis to determine a single set of basis functions representing all of the objects and a corresponding set of basis coefficients for each different type of object. If the data set is for an unknown object, then the dimension reduction analysis and the basis functions are applied to the data set to generate an unidentified set of basis coefficients. This latter set is then statically compared with the reference library of spectra to identify the product or at least designate the closest known products.

U.S. Pat. No. 6,457,644 discloses an item checkout device which combines a produce data collector with an optical bar code data collector. The item checkout device includes a housing, a bar code data collector within the housing, and a produce data collector within the housing. In a preferred embodiment, the item checkout device includes an optical bar code data collector including a first housing, a scale within the first housing, a weigh plate on the scale including a first window for allowing scanning light beams from optical bar code data collector to pass and a second window, and a produce data collector within the first housing including a second housing containing an aperture adjacent the second window, a light source for illuminating a produce item on the second window with substantially uniform light, a light separating element for splitting light collected from the produce item into a plurality of different light portions having different wavelengths, a detector for converting energy in the plurality of light portions into a plurality of electrical signals, and control circuitry which digitizes the plurality of electrical signals to produce a digital spectrum from the produce item which contains information to identify the produce item for the purpose of determining its unit price.

U.S. Pat. No. 5,867,265 discloses an optical identification system which includes a light source with a broad wavelength spectrum that is directed on an object to be identified. Suitable optical components, such as, one or more collimating lenses gather light that is reflected from the object and direct this light into a spectrometer. The spectrometer disperses the collimated light using a dispersing element, such as one or more gratings, prisms or a combination of both, onto an array of detectors. The array of detectors may be comprised of a linear diode array or a charge-coupled device (CCD) array which indicates the amount of light at each of a finely-spaced set of wavelengths covering a wide spectral range. The detectors are sensitive over a wavelength region, for example, in the case of silicon detectors from near-infrared plus the visible region, e.g., from 250 nm to 1100 nm. The set of signals from the detectors is read with an analog to digital converter, and transferred to a computer in the form of a spectrum. A set of known spectra determine the reference spectra and the unknown test spectrum is compared with the reference sets. A software program in the computer compares the test spectrum with reference spectra sets utilizing a statistical program. The program takes into account how much the known spectra vary from one another in addition to the average values. A display reads out a list of possible matches in rank order that have a probability of match greater than a predetermined threshold. An operator checks that the first listed item is correct and either accepts the first choice or indicates the correct choice. As an alternative, the system could automatically accept the first choice.

U.S. Pat. No. 6,075,594 discloses a system and method for optically identifying a product from a reference library of known products based on a reflected spectrum of the product. A broad wavelength light source illuminates the product and a spectrometer receives and forms a plurality of finely spaced wavelengths from the reflected spectrum. A detector optically processes the wavelengths to generate signals proportional to an amount of light received at each of the wavelengths. The signals are normalized and pre-processed to form data sets which relates each of the signals to each of the finely spaced wavelengths. This is performed for all of the different products and compiled. A set of basis functions is then generated for all of the different products and a corresponding set of basis coefficients is generated for each of the different products. This information, along with an electronic label for each product, is stored to form the reference library. When identifying an unknown product, the system generates a set of basis coefficients for the product to be identified. This latter set is statically compared against the reference library to identify the corresponding set of basis coefficients most closely matching the unknown set of basis coefficients.

U.S. Pat. No. 7,044,370 discloses a method and system for self-checkout of items from a retail or non-retail establishment. The system verifies security by comparing a measured physical characteristic of an item with the stored security characteristic for that item and determining if the measured physical characteristic is within an operator-modifiable tolerance range. The operator-modifiable tolerance range is different for different items in the store. Moreover, a stored security characteristic of an item can be updated automatically. In addition, the system includes a dynamic-weight scale that reports a measured weight before the scale settles.

U.S. Pat. No. 6,598,791 discloses a self-checkout system for a retail establishment that allows a customer to checkout multiple items having respective identification codes. The system includes a computer having memory with a buffer, an identification code reader coupled to the computer for determining the identification of the items by the identification codes, a security verification mechanism coupled to the computer for verifying that the items actually being checked out from the retail establishment are the same as those identified by the identification code reader. The computer is adapted to store identification information of multiple items obtained by the identification code reader in the buffer before verifying that the items actually being checked out from the retail establishment are the same as those identified by the identification code reader.

U.S. Pat. No. 5,608,530 discloses a laser for producing a beam of radiation which is then refined in cross-sectional dimension by use of plano-cylindrical lenses. The refined beam of radiation falls incident on a part to be measured. The unobstructed portion of the beam is then bifurcated by a pair of reflective surfaces which produce non-parallel radiating beams; each beam comprised of the unobstructed portion of radiation which has passed radially opposed halves of the part. The magnitude of radiation present in each non-parallel radiating beam is then measured.

U.S. Pat. No. 4,831,251 discloses an optical device for discriminating threaded workpiece by the handedness by their screw thread profiles. The device present a pair of light beams which pass generally tangent to the workpiece at angularly displaced positions. The light beams are inclined to follow the helix direction of a given handedness of a workpiece. Upon axial advancement of a workpiece through the device, a chopped output from the photodetectors indicates that the handedness of the threads matches the inclination of the light beams. The oppositely threaded workpiece, however, provides a generally constant DC output. With appropriate signal processing electronics, an automatic system for discriminating workpieces by thread handedness is provided.

U.S. Pat. No. 5,383,021 discloses a non-contact inspection system capable of evaluating spatial form parameters of a workpiece to provide inspection of parts in production. The system causes parts to be sequentially loaded onto an inclined track where they pass through a test section. The test section includes a length detection array for measuring the length of the workpiece, which includes a source generating a sheet of light oriented in the longitudinal direction of the workpiece. The profile of the parts are evaluated by one or more light sources also creating a sheet of light oriented transversed to the longitudinal axis of the parts. Single channel photodetectors are provided for each of the sources which provides an analog output of the extent to which each sheet of light is occluded by the part. These outputs are analyzed through appropriate signal processing hardware and software to generate length and profile data related to the workpiece geometry.

U.S. Pat. No. 5,568,263 discloses a non-contact inspection system capable of evaluating spatial form parameters of a workpiece to provide inspection of parts in production. The system causes parts to be sequentially loaded onto an incline track where they pass through a test section. The test section includes a length detection array for measuring the length of the workpiece, which includes a source generating a sheet of light oriented in the longitudinal direction of the workpiece. The profile of the parts are evaluated by one or more light sources also creating a sheet of light oriented transverse to the longitudinal axis of the parts. First and second pairs of single channel photodetectors are provided for each of the light sources which provides a pair of analog outputs of the extent to which each sheet of light is occluded by the part, as well as an ability to eliminate noise or scintillation caused by a point source of light, for example with a laser light source. These outputs are analyzed through appropriate signal processing hardware and software to generate length and profile data related to the workpiece geometry.

U.S. Patent Application Publication No. 2005/0174567 discloses a system to determine the presence of cracks in parts. The presence of cracks is determined through the use of an imaging device and illumination source. The part is moved along a track where it is sensed by a position sensor to initiate the inspection. The illumination source protects a sheet of light onto the part to be inspected. The line formed by the intersection of the sheet of light and the part is focused onto the imaging device. The imaging device creates a digital image which is analyzed to determine if cracks are present on the part.

SUMMARY OF THE INVENTION

An object of the present invention is to provide a method and system for automatically identifying non-labeled, manufactured parts in an accurate, reliable and timely fashion.

In carrying out the above object and other objects of the present invention, a method for automatically identifying non-labeled, manufactured parts is provided. The method includes storing templates of a plurality of known good, manufactured parts. Each of the templates includes a part profile and a set of features. Each of the features includes a range of acceptable values, and each of the templates has a part identification code associated therewith. The method further includes optically measuring a profile and features of a part to be purchased, and comparing the profile and the features of the part to be purchased with the profile and corresponding features of each of the stored templates to identify a template which most closely matches the profile and features of the part to be purchased. The method further includes generating and transmitting an identification signal representing the part identification code for the part associated with the most closely matched template.

The step of optically measuring may include the steps of: a) projecting a beam of radiant energy; b) translating the part to be purchased so that the translating part partially obstructs the beam to obtain at least one unobstructed portion of the beam of radiant energy; and c) imaging the at least one unobstructed portion of the beam of radiant energy to obtain a first set of electrical signals.

The method may further include determining a velocity of the translating part, and processing the first set of electrical signals with the velocity to obtain the profile and features of the part to be purchased.

The part to be purchased may be at least partially conductive or semiconductive, and a feature of at least one of the templates may include an eddy current signature. The method may further include the steps of inducing an eddy current in the translating part, sensing the induced eddy current and comparing the eddy current signature with the sensed eddy current.

The step of translating may include the steps of providing an inclined track and dropping the part to be purchased onto the inclined track so that the part slides down the inclined track by the force of gravity.

The step of determining may include the steps of: generating and sensing a series of beams of radiant energy at predetermined spaced positions along a path taken by the translating part so that the translating part sequentially obstructs each of the series of beams.

The part to be purchased may partially obstruct the beam of radiant energy to obtain first and second unobstructed portions, and the first and second unobstructed portions of the beam of radiant energy may be imaged to obtain the first set of electrical signals.

The first and second unobstructed portions of the beam of radiant energy may be imaged in separate first and second image planes.

Each of the first and second unobstructed portions of the beam of radiant energy may contain a magnitude of radiation which is representative of a respective geometric dimension of the part to be purchased.

The part to be purchased may be a fastener.

The fastener may have threads, and at least one of the templates may include at least one feature related to threads.

The fastener may be externally or internally threaded.

The part may be a flat part, or a cylindrical or near-cylindrical part.

Still further in carrying out the above object and other objects of the present invention, a system for automatically identifying non-labeled, manufactured parts is provided. The system includes an electronic storage device to store templates of a plurality of known good, manufactured parts. Each of the templates includes a part profile and a set of features. Each of the features includes a range of acceptable values. Each of the templates has a part identification code associated therewith. A first subsystem optically measures a profile and features of a part to be purchased. The system further includes a processor operable to compare the profile and the features of the part to be purchased with the profile and corresponding features of each of the stored templates to identify a template which most closely matches the profile and features of the part to be purchased and to generate and transmit an identification signal representing the part identification code for the part associated with the most closely matched template.

The first subsystem may include: a) a projector to project a beam of radiant energy; b) a feed mechanism to translate the part to be purchased so that the translating part partially obstructs the beam to obtain at least one unobstructed portion of the beam of radiant energy; and c) an imager to image the at least one unobstructed portion of the beam of radiant energy to obtain a first set of electrical signals.

The system may further include a second subsystem to determine a velocity of the translating part. The processor may be further operable to process the first set of electrical signals with the velocity to obtain the profile and features of the part to be purchased.

The part to be purchased may be at least partially conductive or semiconductive. A feature of at least one of the templates may include an eddy current signature, and the system may further include an eddy current sensor to induce an eddy current in the translating part and to sense the induced eddy current. The processor may also compare the eddy current signature with the sensed eddy current.

The feed mechanism may include a track inclined so that the part slides down the inclined track by the force of gravity.

The second subsystem may include a plurality of sensors to generate and sense a series of beams of radiant energy at predetermined spaced positions along a path taken by the translating part so that the translating part sequentially obstructs each of the series of beams.

The part to be purchased may partially obstruct the beam of radiant energy to obtain first and second unobstructed portions. The first and second unobstructed portions of the beam of radiant energy may be imaged to obtain the first set of electrical signals.

The first and second unobstructed portions of the beam of radiant energy may be imaged in separate first and second image planes.

Each of the first and second unobstructed portions of the beam of radiant energy may contain a magnitude of radiation which is representative of a respective geometric dimension of the part to be purchased.

The part to be purchased may be a fastener.

The fastener may have threads, and at least one of the templates may include at least one feature related to threads.

The fastener may be externally threaded, or may be internally threaded.

The part may be a flat part, or may be a cylindrical or near-cylindrical part.

Yet still further in carrying out the above object and other objects of the present invention, a system for automatically identifying non-labeled, manufactured parts is provided. The system includes means for storing templates of a plurality of known good, manufactured parts. Each of the templates includes a part profile and a set of features. Each of the features includes a range of acceptable values, and each of the templates has a part identification code associated therewith. The system further includes means for optically measuring a profile and features of a part to be purchased, and means for comparing the profile and the features of the part to be purchased with the profile and corresponding features of each of the stored templates to identify a template which most closely matches the profile and features of the part to be purchased. The system still further includes means for generating and transmitting an identification signal representing the part identification code for the part associated with the most closely matched template.

The means for optically measuring may include: a) means for projecting a beam of radiant energy; b) means for translating the part to be purchased so that the translating part partially obstructs the beam to obtain at least one unobstructed portion of the beam of radiant energy; and c) means for imaging the at least one unobstructed portion of the beam of radiant energy to obtain a first set of electrical signals.

The system may further include means for determining a velocity of the translating part; and means for processing the first set of electrical signals with the velocity to obtain the profile and features of the part to be purchased.

The part to be purchased may be at least partially conductive or semiconductive. A feature of at least one of the templates may include an eddy current signature. The system may further include means for inducing an eddy current in the translating part and sensing the induced eddy current. The means for comparing may also compare the eddy current signature with the sensed eddy current.

The means for translating may include a track inclined so that the part slides down the inclined track by the force of gravity.

The means for determining may include means for generating and sensing a series of beams of radiant energy at predetermined spaced positions along a path taken by the translating part so that the translating part sequentially obstructs each of the series of beams.

The part to be purchased may partially obstruct the beam of radiant energy to obtain first and second unobstructed portions. The first and second unobstructed portions of the beam of radiant energy may be imaged to obtain the first set of electrical signals.

The first and second unobstructed portions of the beam of radiant energy may be imaged in separate first and second image planes.

Each of the first and second unobstructed portions of the beam of radiant energy may contain a magnitude of radiation which is representative of a respective geometric dimension of the part to be purchased.

The part to be purchased may be a fastener.

The fastener may have threads, and at least one of the templates may include at least one feature related to threads.

The fastener may be externally threaded, or may be internally threaded.

The part may be a flat part, or may be a cylindrical or near-cylindrical part.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

In general, one embodiment of the method and system of the present invention utilizes non-contact optical inspection technologies to map profiles of small cylindrical parts. The embodiment has a part setup procedure for a user to capture an image of a known dimensioned part and define a set of features with acceptable range of limit values for them. The part profile and features are referred to as the part template. During part ID mode, the profile of each inspected part is captured and its features are compared to their limit values. If any feature of a part is determined to be outside its range of limits, then it is not identified.

The preferred method for capturing a part profile is to pass the part through a directional plane of light that is sensed or measured by a power meter or detector. The uninterrupted light is of a know power. The dimension, usually referred to as the diameter, of a part perpendicular to the direction of light at the point it intersects the light is determined by the power meter, which would sense less light. The diameter at each point on the part along the direction of travel is measured.

Figure 1:
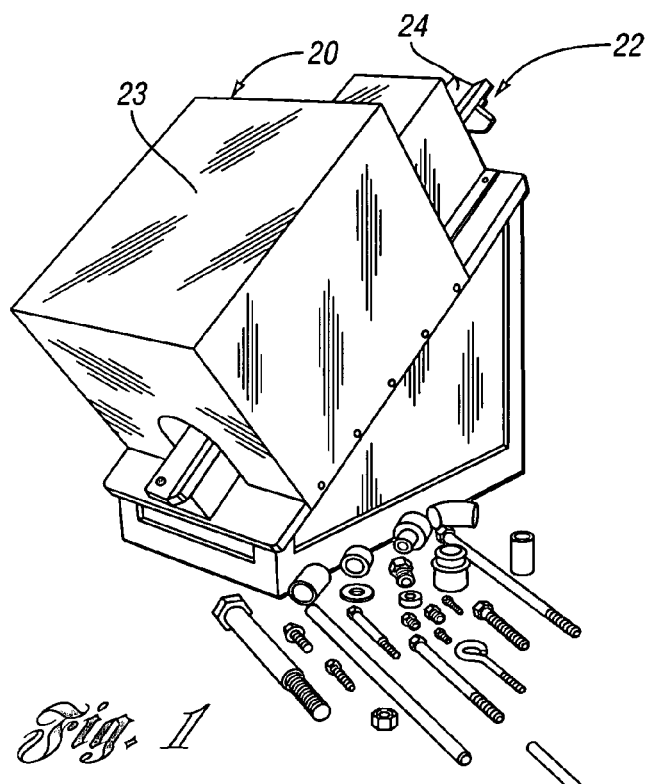
FIG. 1 is a schematic perspective view of one embodiment of a system of the present invention together with a plurality of non-labeled, manufactured parts capable of being automatically identified with the system.

Referring to FIG. 1, there is illustrated one embodiment of a system, generally indicated at 20, for automatically identifying non-labeled, manufactured parts. Such parts may include, as illustrated in FIG. 1, fasteners, whether threaded or not, such as nuts, bolts, nails. Such parts may include flat parts such as washers or cylindrical or near-cylindrical (i.e., have a small cosine error) parts such as plastic tubular members. The parts may be at least partially conductive, semiconductive, or conductive. The parts may be plated or non-plated, heat-treated or non-heat-treated, or include seams. Typically, the parts may have a diameter range of 2 mm to 35 mm and a length range of 10 mm to 150 mm.

Figure 2:
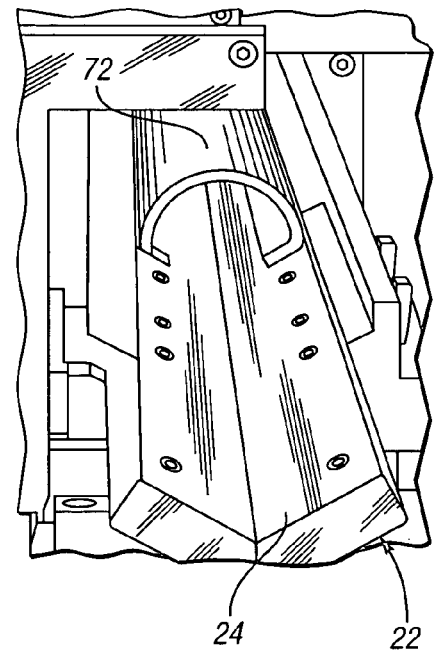
FIG. 2 is a perspective schematic view, partially broken away, of a part feed mechanism supported within a system constructed in accordance with an embodiment of the present invention wherein the system includes an eddy current sensor including eddy current coils.

Referring to FIGS. 1 and 2, the system 20 includes a feed mechanism or subsystem, generally indicated at 22, supposed within a housing 23 of the system 20. The feed mechanism 22 includes a V-shaped track 24, the sides of which are preferably aligned with respect to each other at a angle of approximately 120°.

Figures 4, 5:
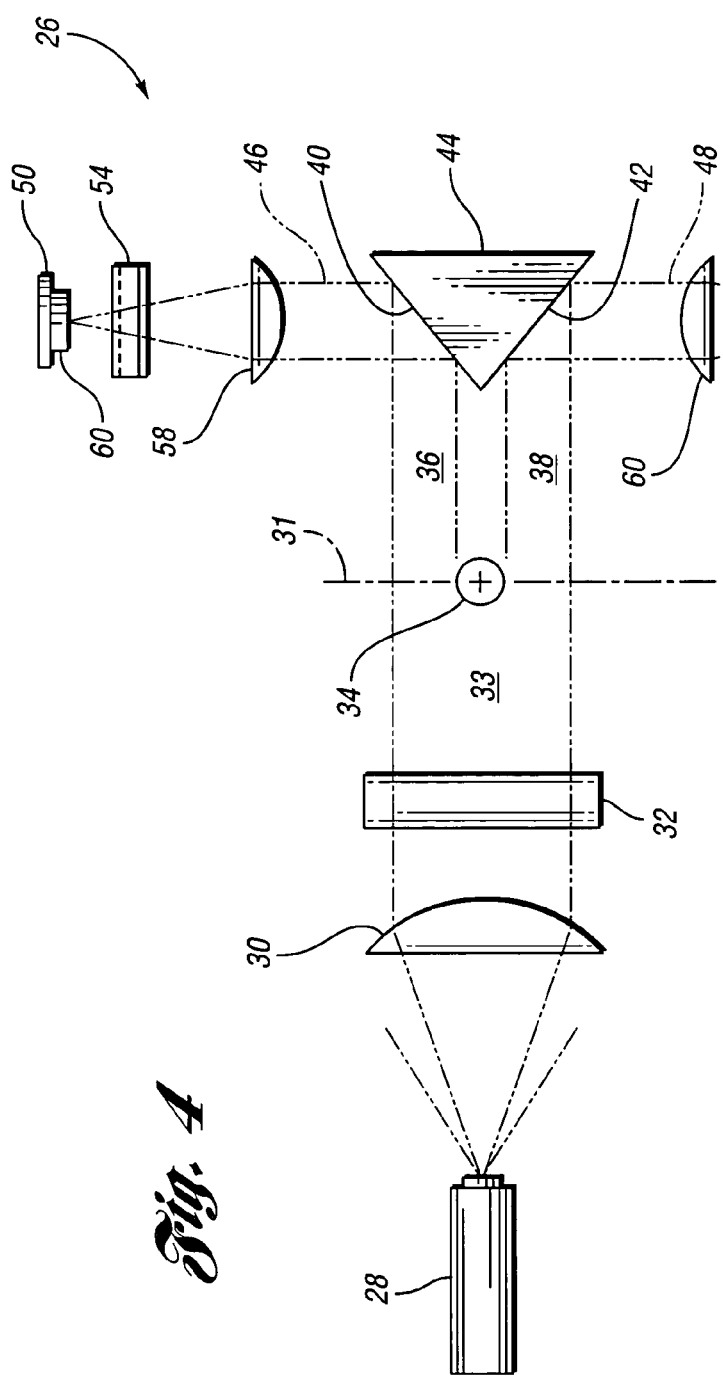
FIG. 4 is a side schematic view of one embodiment of an optical subsystem of the system of the present invention.
FIG. 5 is a portion of a screen shot of a display which illustrates the types of part features which can be optically measured using the method and system of the present invention in order to identify the part to be purchased.
Figure 8:
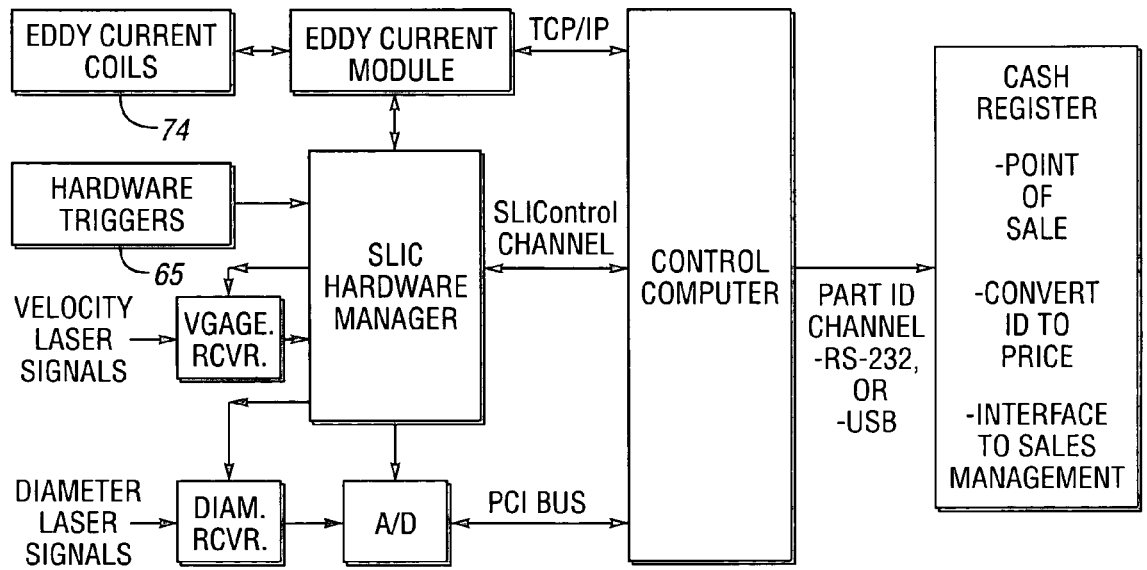
FIG. 8 is a more detailed block diagram of the hardware of FIG. 7.

Referring now to FIG. 4, an optical subsystem, generally indicated at 26, is now described. Generally, the subsystem 26 includes a laser 28 for producing a beam of radiation which is then shaped in cross-sectional dimension by use of plano-cylindrical lenses 30 and 32. The lens 32 focuses the beam 33 to a focal point which forms a line 31. The refined beam 33 of radiation falls incident on a part 34 to be measured. The unobstructed portions 36 and 38 of the beam 33 are then redirected by a pair of reflective surfaces 40 and 42 of a prism 44 producing radiating beams 46 and 48; each beam 46 and 48 comprises the unobstructed portion of radiation which has passed radially opposed halves of the part 34. The magnitude of radiation present in each radiating beam 46 and 48 is then measured by optical measurement sensors or optical or photo detectors 50 and 52 after passing through plano-cylindrical lenses 54 and 56, respectively, and negative concave lenses 58 and 60, respectively. The magnitude of radiation measured at sensing elements 60 and 62 of the detectors 50 and 52, respectively, is proportional to a dimensional measurement of the part 34. The diameter at each point on the part 34 along its direction of travel is measured. The photo detectors 50 and 52 provide diameter laser signals as shown in FIG. 8. The optical system 26 is described in greater detail in U.S. Pat. No. 5,608,530.

Preferably, instead of the prism 44, a pair of offset mirror elements may provide a pair of reflective surfaces to direct the beams 46 and 48 side-by-side to a pair of side-by-side photo detectors.

Figure 3:
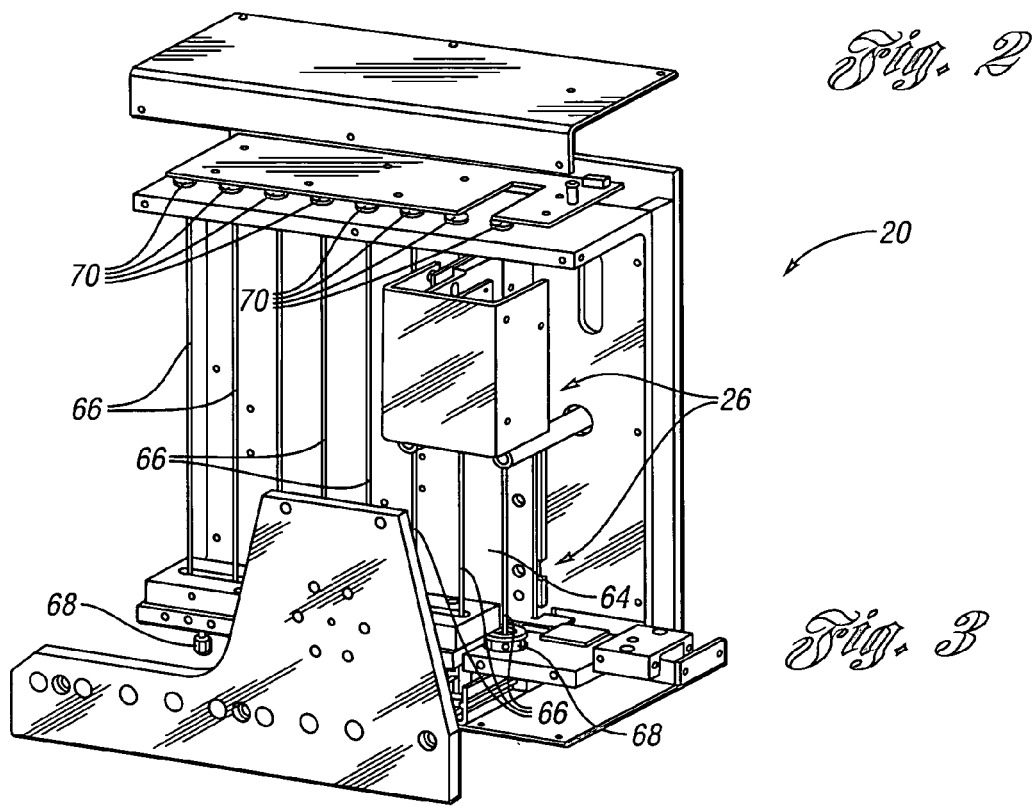
FIG. 3 is an exploded perspective schematic view of a portion of a system constructed in accordance with an embodiment of the present invention and illustrating the optical part measurement sensors and a trigger which generate corresponding electrical signals which are subsequently processed.

Referring to FIG. 3, the preferred optical subsystem 26 of FIG. 4 is incorporated in upper and lower portions of the system 20 to generate a sheet 64 of light through which a part (not shown in FIG. 3) translated by means of the inclined track (not shown in FIG. 3) 24 of the feed mechanism 22. The sheet 64 of light is generated in response to a trigger signal or pulse emitted by a central unit or hardware trigger 65 (i.e., FIG. 8) when a pencil light beam (not shown) in the track 24 is blocked.

Also shown in FIG. 3 are a series of eight parallel beams of light 66 which are generated by laser diode assemblies (only two of which is shown at 68) at predetermined spaced positions below the path taken by the translating part 34 along the track 24 so that the translating part sequentially obstructs each of the series of beams. The beams 66 extend through small holes formed in the track and strike a corresponding series of spaced photo detectors 70 supported at an upper portion of the system 20. In this way, a velocity of translating part is estimated based on the time at which the beams 66 are either detected or not detected by the photo detectors 70 as indicated by the velocity laser signals in FIG. 8 which are received by a velocity gauge receiver and subsequently processed. Typically, once the velocity of the translating part is determined, the velocity is processed with the diameter laser signals to obtain a profile and features of the part 34 as will be described in greater detail hereinbelow.

Referring again to FIG. 2, there is illustrated an eddy current sensor 72 which includes coils 74 (i.e., FIG. 8) which not only induce an eddy current in the translating part 34, but also sense the induced eddy current to provide a signal to an eddy current module (i.e., FIG. 8), which represents the amount of induced eddy current.

Again, pencil light beams in the V-slide monitor the part's progress as it falls down the track 24 or slide. Each pencil light beam is associated with a small control unit or hardware trigger that produces an electrical pulse when the light is blocked; the pulse is referred to as a "trigger." Two of these are typically associated with the eddy current hardware. For eddy current, these essentially provide a "get ready", then a "get set" signal to the hardware than controls the induced eddy current.

Figure 7:
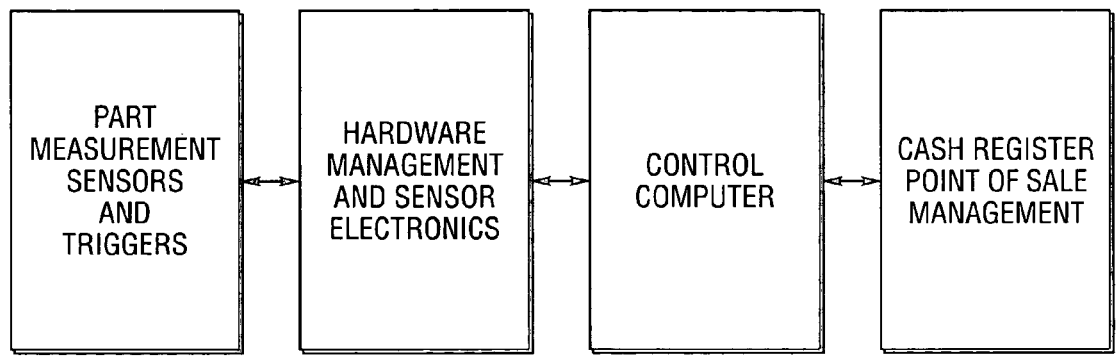
FIG. 7 is a generalized block diagram of hardware constructed in accordance with one embodiment of the system of the present invention.

Referring now to FIGS. 7 and 8, the hardware of the system 20 includes four main subsystems. Part measurement sensors and triggers include velocity gauge lasers and sensors, diameter gauge lasers and sensors, hardware triggers that monitor the passage of the part down the V-slide, and eddy current measurement coils. Hardware management and sensor electronics include a SLIC hardware manager and a number of modules required to convert the measurement signals to information a control computer can utilize. The control computer performs all signal processing, manages the user interface, and has a communication interface to a cash register.

Figure 9:
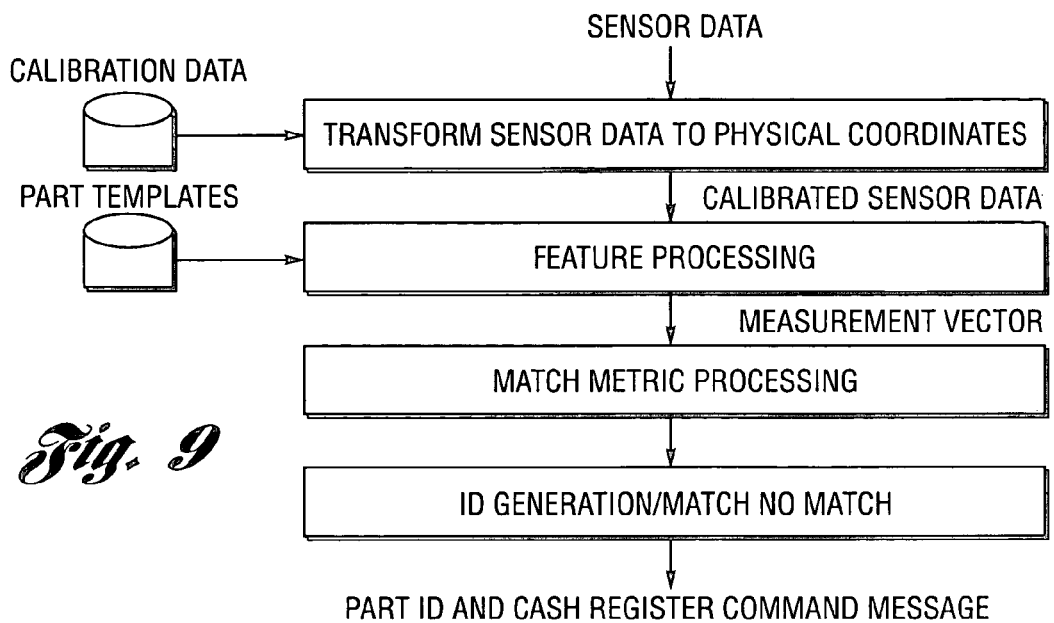
FIG. 9 is a block diagram which illustrates the flow of data utilizing one embodiment of a method of the present invention.

Referring now to FIG. 9, the data and signal processing system described therein illustrates how the system processes sensor data and discovers the ID of the part presented to the system. Using calibration data, sensor data is transformed to a description of the outline of the part, specified in calibrated physical coordinates. Feature processing extracts values for each feature contained in the entire part template data set. Match metric processing identifies the best match to the sensor data among the part templates. ID generation evaluates the best match; if the match is good enough, the part is said to be identified, otherwise the part is not identified. After ID generation, a message is sent to the cash register, containing the part ID or a "not matched" indication.

When a new part is added to the system 20, a file called a "template" is created. The template file contains information about the part that is used to identify it. The template is set up so that any part of the given type will match the template, and any part not of the given type will not match.

Figure 10:
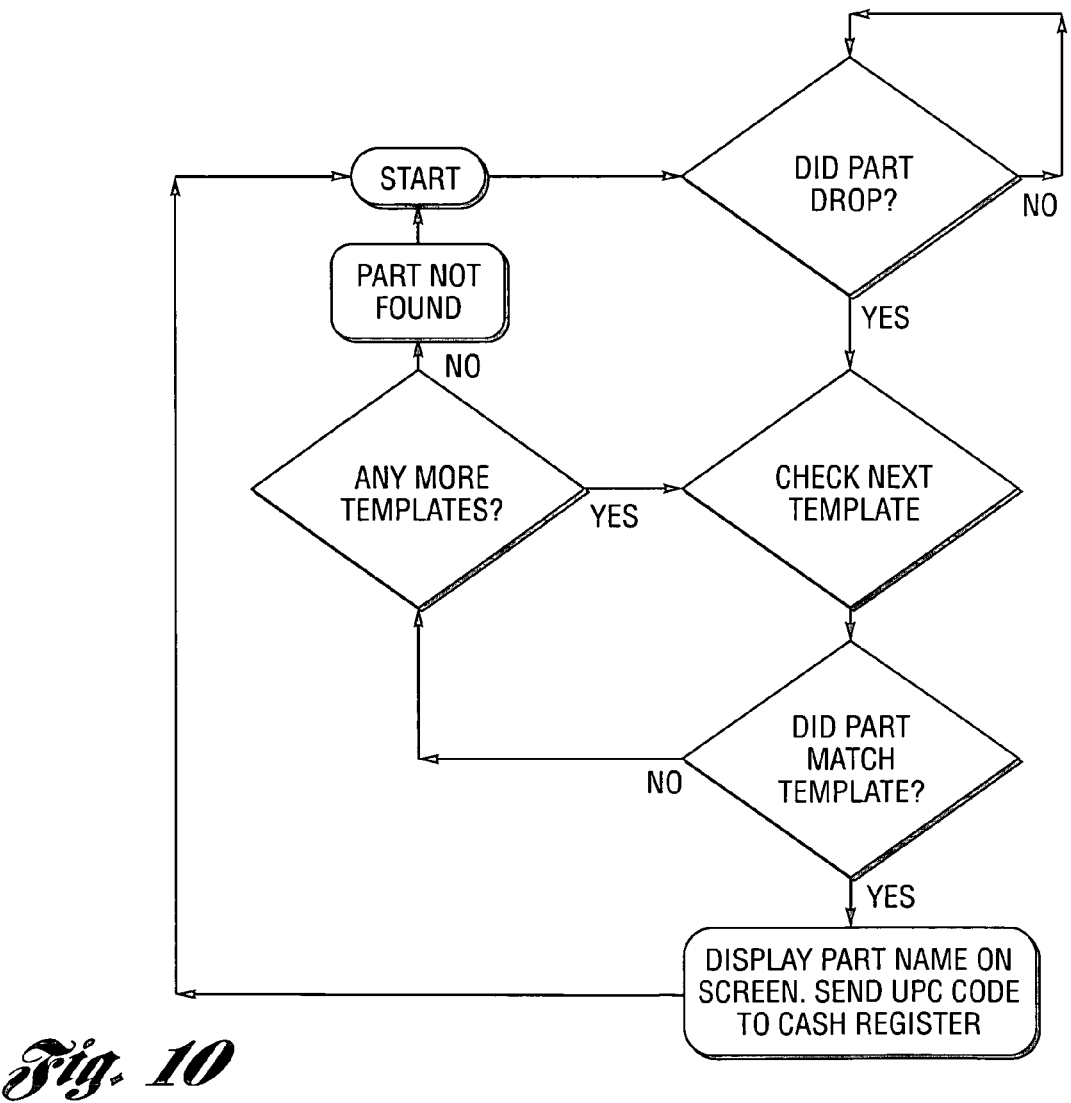
FIG. 10 is a flock diagram flow chart illustrating the sequence of some of the steps of one embodiment of the method.

When the user drops a part to be purchased on the machine track 24, as illustrated in FIG. 10, the software acquires data containing the profile and eddy signature of the part. The software then checks all the templates in the list to find a match. If the part matches one of the templates, then the part is identified. If none of the templates match, the part is not identified.

In general, when setting up a new part, the user chooses "features" of the part to be measured. The measurements of the features will distinguish the new part from the other parts in the system. The types of features include total length, internal length, diameter, thread, taper, and eddy current signature. For most features, the user chooses a region of the part where the measurement will be made, a nominal value of the measurement (the value the part should have if it's the right part), and plus and minus tolerances which determine if the measurement is close enough to match the part. For some features, such as total length and eddy, the measurement region is the whole part. Also, for eddy current the user chooses a rectangle on the eddy screen of a display instead of a nominal value and tolerances. If the eddy signature hits the rectangle, then the part is a match.

The user chooses which features are needed to distinguish the new part. For a wirenut, for example, the user would typically add a total length feature and a taper feature. A bolt may need total length, thread, and one or two diameters. If it is necessary to distinguish the type of material or coating to distinguish a bolt from another bolt, the user would add the eddy feature.

When all of the necessary features have been set up in a template, the user saves the template. This adds it to the list of templates to check when a part is dropped during the part identification operation, as previously described.

More particularly, in creating a template a gold or master part with known good dimensions is dropped on the inclined track so it slides down the track after the particular part is named. After the part has traveled the length of the track, an image of the part is displayed on a screen, as generally shown in the screen shot of FIG. 6.

After a good image of the part is obtained, features are added to the template as previously mentioned. For example, when adding an internal length, as noted in the second display block of FIG. 5, points are determined on the part when one wishes to measure the internal length (i.e., here the length of the head of the bolt). One can add multiple internal lengths for each part. Internal lengths can be used to measure features like: thread length, shoulder length, head height, under the head to the start of a part, and any length measurement needed inside of a part.

Such predefined points are also useful for other template features like diameters (i.e., third block of FIG. 5) and tapers (i.e., fifth block of FIG. 5). Such predefined points are useful when looking for rising and falling edges of the part as well as when looking for minimum and maximum diameters of the part.

The diameter feature is used to measure diameters around a part. Multiple diameters can be added for each part as shown in the third block. One can select minimum and maximum diameters for a selected area (or a small groove within a selected area) or one can average all the diameters in the area selected.

With respect to taper features, tapers are used to measure tapered angles on a part. Multiple tapers can be added for each part.

The external/overall length feature is automatically added to the list of features once the part has been scanned (i.e., travels down the track). The length is measured by the velocity sensors and is determined by the start and end predefined points.

With respect to the thread features (i.e., block 4 of FIG. 5), the tolerances on the following thread features can change: thread count, thread pitch, pitch diameter, functional size, lead deviation, minor diameter, and major diameter.

Figure 6:
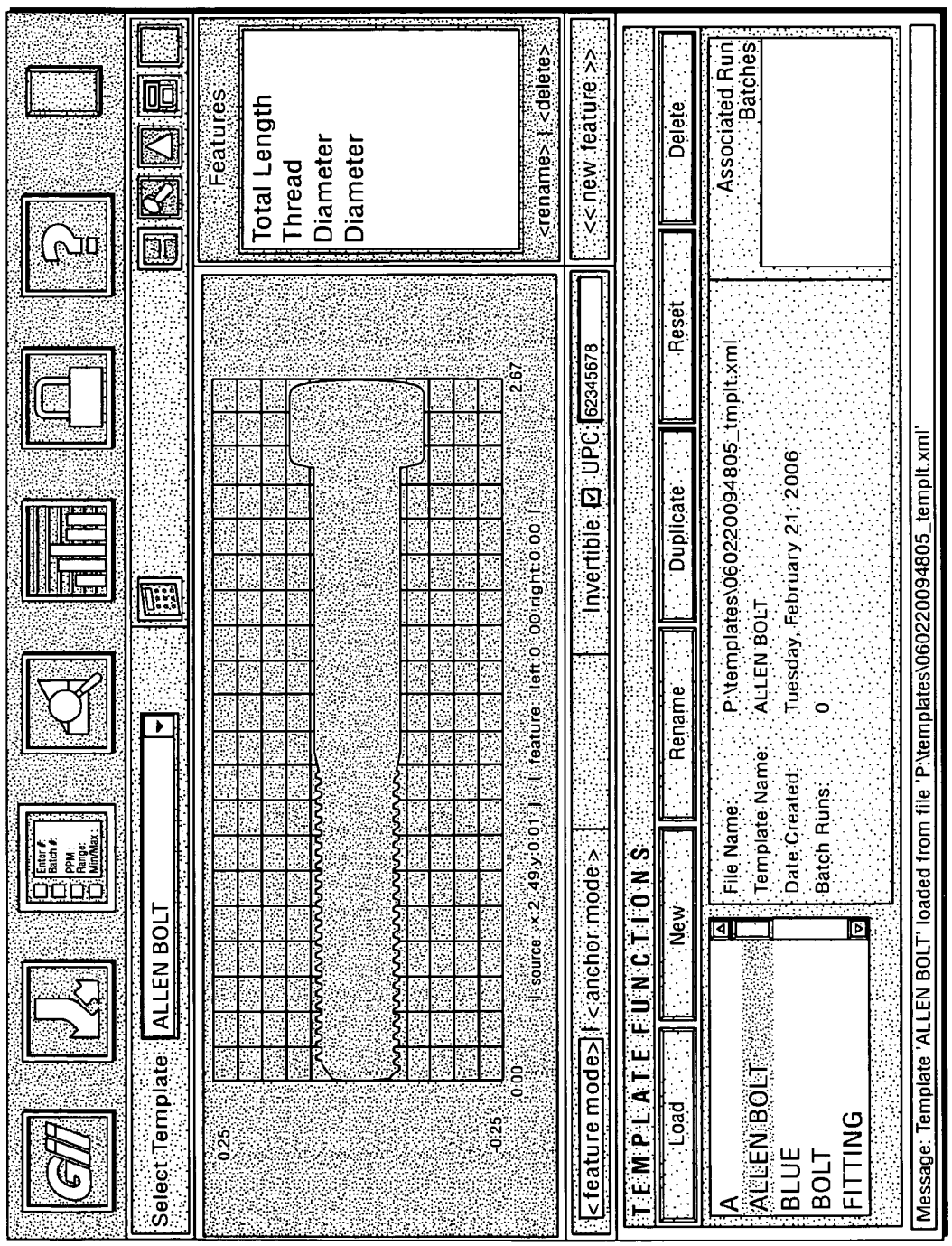
FIG. 6 is a screen shot on the screen of a display which illustrates a template including the profile of a Allen bolt having a number of features and a UPC (i.e., Universal Product Code)

With respect to the UPC codes, the designated UPC code can be entered on the touch screen to identify the part corresponding to a particular template as shown in FIG. 6, which also shows various features of an Allen bolt.

With respect to eddy current (i.e., the rightmost box of FIG. 5), a frequency parameter is initially set up for a particular part. A relatively low frequency such as 1 KHz may be used to check for material and a relatively high frequency such as 50 KHz may be used to check for plating of a part. During the generation of a template for eddy current, a known good part is sent down the track to get a signature of the part on the screen. After obtaining a signature, one may have to adjust the parameters of the frequencies and the gains while testing a good part, until a good image is obtained on a screen of a display. A good image should have a defined area, like a loop, that will have some space inside it. After establishing the eddy current signature of a good part, the area of the signature one wants to inspect may be highlighted.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

For example, the system could include multiple sensors (lasers) to provide multiple inspections around a part. A laser head oriented to "look" down at the bottom track where flat parts like washers and nuts would ride would improve the inspection and identification of the part.

The axis of the "Vee" track is preferably canted a few degrees to allow flat parts to ride on the bottom track.

What is claimed is:

1. A method for automatically identifying non-labeled, manufactured parts, each of the parts having a diameter, the method comprising:

storing templates of a plurality of known good, manufactured parts, each of the templates including a part profile and a set of features needed to distinguish the part from other parts, the set of features including at least one of total length, internal length, at least one diameter, thread, and taper wherein each of the features includes a range of acceptable values and wherein each of the templates has a universal product code associated therewith and wherein each universal product code identifies a part and a manufacturer of the part;

providing an inclined track;

dropping a part to be purchased onto the inclined track so that the part slides down the inclined track by the force of gravity;

projecting a plane of light having a width wider than the diameter of the part onto one side of the part as the part slides down the track to obtain left and right unobstructed portions of the plane of light;

detecting the left and right portions of the plane of light to image the left and right portions of the outer edges of the sliding part and to obtain a first set of electrical signals;

determining a velocity of the sliding part;

processing the first set of electrical signals with the velocity to obtain a profile and a value for each of the features of the sliding part without the need to detect a portion of the plane of light obstructed by the sliding part;

comparing the profile and the features of the part to be purchased with the profile and corresponding features of each of the stored templates to identify a template which most closely matches the profile and features of the part to be purchased; and automatically generating and transmitting an identification signal representing the universal product code for the part associated with the most closely matched template based on the identified template without the need to detect a portion of the plane of light blocked or reflected by the sliding part.

2. The method as claimed in claim 1, wherein the part to be purchased is at least partially conductive or semiconductive, wherein a feature of at least one of the templates includes an eddy current signature and wherein the method further comprises the steps of inducing an eddy current in the sliding part, sensing the induced eddy current and comparing the eddy current signature with the sensed eddy current.

3. The method as claimed in claim 1, wherein the step of determining includes the steps of: generating and sensing a series of beams of radiant energy at predetermined spaced positions along a path taken by the sliding part so that the sliding part sequentially obstructs each of the series of beams.

4. The method as claimed in claim 1, wherein the part to be purchased is a fastener.

5. The method as claimed in claim 4, wherein the fastener has threads and wherein at least one of the templates includes at least one feature related to threads.

6. The method as claimed in claim 5, wherein the fastener is externally threaded.

7. The method as claimed in claim 5, wherein the fastener is internally threaded.

8. The method as claimed in claim 1, wherein the part is a flat part.

9. The method as claimed in claim 1, wherein the part is a cylindrical or near-cylindrical part.

10. A system for automatically identifying non-labeled, manufactured parts, each of the parts having a diameter, the system comprising:

an electronic storage device to store templates of a plurality of known good, manufactured parts, each of the templates including a part profile and a set of features needed to distinguish the part from other parts, the set of features including at least one of total length, internal length, at least one diameter, thread and taper wherein each of the features includes a range of acceptable values and wherein each of the templates has a universal product code associated therewith and wherein each universal product code identifies a part to be purchased and a manufacturer of the part;

a feed mechanism including a track inclined so that a part to be purchased and dropped onto the track slides down the track by the force of gravity;

a projector to project a plane of light having a width wider than the diameter of the part as the part slides down the track to obtain left and right unobstructed portions of the plane of light to image the left and right portions of the outer edges of the sliding part and to obtain a first set of electrical signals;

a subsystem to determine a velocity of the sliding part;

a processor operable to process the first set of electrical signals with the velocity to obtain a profile and a value for each of the features of the sliding part and to compare the profile and the features of the sliding part to be purchased with the profile and corresponding features of each of the stored templates to identify a template which most closely matches the profile and features of the sliding part to be purchased and to automatically generate and transmit an identification signal representing the universal product code for the part associated with the most closely matched template based on the identified template without the need to detect a portion of the plane of light obstructed by the sliding part.

11. The system as claimed in claim 10, wherein the part to be purchased is at least partially conductive or semiconductive, wherein a feature of at least one of the templates includes an eddy current signature and wherein the system further comprises an eddy current sensor to induce an eddy current in the sliding part and to sense the induced eddy current, the processor also comparing the eddy current signature with the sensed eddy current.

12. The system as claimed in claim 10, wherein the subsystem includes a plurality of sensors to generate and sense a series of beams of radiant energy at predetermined spaced positions along a path taken by the sliding part so that the sliding part sequentially obstructs each of the series of beams.

13. The system as claimed in claim 10, wherein the part to be purchased is a fastener.

14. The system as claimed in claim 13, wherein the fastener has threads and wherein at least one of the templates includes at least one feature related to threads.

15. The system as claimed in claim 14, wherein the fastener is externally threaded.

16. The system as claimed in claim 14, wherein the fastener is internally threaded.

17. The system as claimed in claim 10, wherein the part is a flat part.

18. The system as claimed in claim 10, wherein the part is a cylindrical or near-cylindrical part.

* * * * *